2,744,017

REMOVAL OF SUGARS BY ENZYMATIC PROCESS

Robert Russel Baldwin, East Orange, N. J., assignor to Ben L. Sarett, Chicago, Ill.

No Drawing. Application August 15, 1950,
Serial No. 179,652

20 Claims. (Cl. 99—150)

This invention relates to an enzymatic process and the product formed by the process. The invention has particular usefulness in the preparation of certain food products in order to improve their quality and storage properties. The invention is particularly useful in the preparation of dehydrated egg products, but it also finds use in the processing of other foods, such as potatoes, coconut, cereals and the like.

At the present time there is no wholly satisfactory process for preparing stable dry egg elbumen which is consistently of sufficiently high quality to permit it to be incorporated into certain food products, such as prepared cake, waffle and biscuit mixes. Dried egg albumen prepared by the usual dehydrating processes, such as freeze-drying, pan-drying or fluff-drying, has a tendency to undergo a "Maillard Type" browning reaction on storage which results in the development of an off-color in the product. It is generally considered that this browning is the result of the reaction between the glucose and a protein or hydrolyzed protein normally contained within the egg whites.

Accordingly, various attempts have been made in the past to remove naturally occurring glucose from egg whites prior to the time that the whites are subjected to the drying operation. Up to the present time the only commercial methods that have been satisfactory in any degree for removing this naturally occurring glucose are fermentation methods wherein the egg white is subjected to fermentation by bacteria or yeasts in order to convert the glucose to carbon dioxide, water, ethyl alcohol and/or lactic acid.

One of the fermentation processes that has been extensively employed is that which involves the fermentation of egg whites by naturally occurring lactic acid bacteria. Generally this process is not susceptible to ready control since sterile techniques are practically impossible in the commercial fermentation of a raw egg white material. This prior process involves allowing the raw egg whites to undergo a natural fermentation for a period usually longer than about 24 hours and the lactic acid bacteria present cause the conversion of glucose to lactic acid, carbon dioxide and water. The inoculant for a batch of egg whites is usually about 10 to 20 per cent by volume of a previously fermented batch. Inasmuch as sterile techniques are practically impossible, there are many other microorganisms involved in this fermentation and the growth of many of them in the egg white results in the production of excessive off-odors and off-flavors in the final product.

A further disadvantage of the lactic acid fermentation process is that the hydrogen ion concentration of the batch being fermented usually ends up at a value corresponding to pH 6.0 or lower. The maintenance of this low pH is necessary to insure that other microorganisms do not compete with the lactic acid bacteria to produce undesired fermentation products. However, when the hydrogen ion concentration of the eggs undergoing fermentation is allowed to fall as low as pH 6.0, a heavy scum forms on the surface of the fermenting mixture. This scum is due to the precipitation of the mucin and mucoid fractions normally present in egg whites. This scum must be removed from the surface of the fermentation vat and may represent a loss of from 10 to 15 per cent of the total solids. Inasmuch as the mucin and the mucoid fractions begin to separate from egg whites when the hydrogen ion concentration is lowered to a value below pH 6.3, substantially all of this material is lost to the final product. The mucin and mucoid fractions are very desirable in dried egg whites, not only because of their nutritive value, but because they increase the whipping characteristics of the final product. Mucin or mucoid fractions which have once been precipitated in the lactic acid fermentation in the form of a scum cannot effectively be reconstituted into the product since these fractions have thereby become denatured and have lost many of their desirable qualities.

Another process that has been suggested for commercial operation in removing glucose from egg whites is a fermentation process involving certain yeast, the yeast serving selectively to remove a substantial portion of the glucose from egg whites undergoing fermentation. However, here again sterile techniques are practically impossible and the fermentation reaction is difficult to control. There is a relatively long time factor in carrying out this fermentation which is more or less unpredictable and there is always the danger of substantial contamination by other microorganisms which will often result in the formation of a product having off-odor and off-flavor. When this happens it is necessary to divert the final product from the intended use since its high quality is adversely affected particularly where the product is intended for use in the baking, candy making or ice cream industries.

A further disadvantage of the fermentation processes for producing high quality dried eggs or egg albumen is that care must be taken to use fresh eggs or eggs having a low natural bacterial count. If eggs having a high bacteria count are employed those bacteria which may be proteolytic in nature compete with the intended fermenting organisms, thus giving rise to end products that contribute to the production of undesired off-odors and off-flavors.

Accordingly, an object of this invention is the provision of a process of preparing a food product which is stable on storage and which does not have a tendency to develop off-odors or off-flavors.

A further object of this invention is the provision of a process of removing glucose from certain food products whereby the quality of the final product is consistently high and which is stable on prolonged storage.

A still further object of this invention is the provision of a process for removing glucose from certain food products which may be simply and readily controlled to conform to a predetermined plant schedule.

A still further object of this invention is the provision of a process for the removal of glucose from certain types of food products in such a manner that the microflora of the final product is not increased but may, in fact, be reduced over the naturally occurring material.

A still further object of this invention is the provision of a rapid and effective process for removing glucose from egg whites or other egg constituents.

A still further object of this invention is the provision of a new egg or other food product which has qualities consistently superior to those known to the prior art.

A further object of this invention is the provision of a process for removing glucose from egg whites at a hydrogen ion concentration below (i. e. pH values above) that at which the desirable mucin and mucoid fractions of egg whites will precipitate.

A still further object of this invention is the provision of a process of removing glucose from egg whites in a manner that may be readily controlled so that the glucose removal step may be prescheduled to fit in with the dehydrating equipment schedule of an egg processing plant.

A still further object of this invention is the provision of a new food product characterized by its aldose acid content and by its reduced aldose content and containing a protein or other substance which would otherwise react with the aldose to form substances which are undesirable in food products of this kind.

A still further object of this invention is the provision of a superior dehydrated egg albumen which is consistently of excellent quality for incorporating into prepared mixes for cakes, waffles, biscuits and the like.

Further and additional objects will appear from the following description and the appended claims.

In accordance with one embodiment, the process of this invention involves the treatment of a food product, in the presence of oxygen, with an enzymatic oxidase which is specific for the aldose sugar which is desired to be removed from the food product. The aldose which is usually desired to be removed from a food, such as eggs, potatoes, coconut or cereal, is glucose, and the enzyme that is capable of oxidizing glucose to remove it as such from a food product is the enzyme known as glucose oxidase. Glucose oxidase in the presence of oxygen serves to convert the glucose to gluconic acid in accordance with the following reaction:

(1) 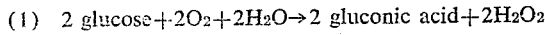 $2 \text{ glucose} + 2O_2 + 2H_2O \rightarrow 2 \text{ gluconic acid} + 2H_2O_2$ The process of this invention may be carried out on a wide number of food products and may be effected under a variety of conditions, depending upon the particular results desired. The enzymatic conversion of the aldose, such as glucose, by glucose oxidase requires the presence of free oxygen. In accordance with a preferred embodiment of this invention, this free oxygen is supplied by the addition of catalase to the medium and the continuous addition of hydrogen peroxide. The catalase enzymatically decomposes the hydrogen peroxide added, as well as the hydrogen peroxide formed in the glucose oxidation step, to liberate free oxygen and this free oxygen is then utilized in the oxidation of additional glucose. The reaction involving the production of oxygen by the decomposition of hydrogen peroxide may be represented by the following equation.

(2) 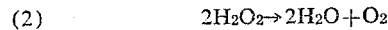 $2H_2O_2 \rightarrow 2H_2O + O_2$

It will be noted by combining Equations 1 and 2 that all of the oxygen initially present in the system is used for the glucose oxidation step. Therefore it is necessary in this embodiment of the invention to add additional quantities of hydrogen peroxide to the solution in an amount sufficient to supply oxygen for the conversion of the glucose to gluconic acid. In practice it is preferred to add the hydrogen peroxide slowly and over a period of time so that excess foaming will not occur and so that the oxygen may be utilized as it is produced for the oxidation of the glucose.

In the foregoing it has been suggested that a combination of catalase and hydrogen peroxide be present in the medium undergoing oxidation for the purpose of supplying the necessary free oxygen. However, it will be apparent that, if desired, substances other than catalase could be employed which are known to catalyze the reaction involving the decomposition of hydrogen peroxide to free oxygen and water. Catalase is preferred for the reason that only minute quantities are required and its presence is not objectionable in the final food product. However, it is possible to use certain chemical catalysts, such as compounds of iron, manganese or platinum or osmic acid. In connection with osmic acid, however, that compound is highly poisonous and would not normally be suitable for use where the preparation of a product intended for food purposes were contemplated. Other chemical compounds, such as compounds of iron, manganese or platinum, may have a tendency to produce off-colors or other undesirable reaction products in foods.

Hydrogen peroxide per se has been specifically mentioned for use in connection with catalase or other hydrogen peroxide decomposing catalysts. It will be apparent, however, that hydrogen peroxide, while probably the most feasible from a commercial point of view, could be replaced by any substance which would be capable of liberating hydrogen peroxide directly within the medium treated. Such substances are urea peroxide, sodium phosphate peroxide, calcium peroxide, sodium peroxide, the perborates and the like. These last mentioned compounds may not be entirely satisfactory since their use may represent an undesired contaminating factor in the end food product.

While it is preferred to employ hydrogen peroxide or a hydrogen peroxide liberating compound as the source of oxygen for the reaction, it will be apparent that other sources of free oxygen may be utilized. For example, under certain conditions the enzymatic reaction may be carried out by beating or otherwise highly agitating the medium undergoing conversion so that the oxygen of the air is thoroughly dispersed therein. Also oxygen may be bubbled through the medium in the pure form or in the form of air. If desired, it is also possible to employ oxygen under pressure so as to provide a partial pressure of oxygen within the solution sufficient to supply the requirements of the glucose oxidation reaction.

The glucose oxidase and catalase (when used) may be obtained from any source that is now known to be available. For example, catalase may be prepared from the mycelia of molds in accordance with the process disclosed in the application of Dwight L. Baker, Serial No. 788,036, filed November 25, 1947, now Patent No. 2,635,069, dated April 14, 1953. The glucose oxidase may be prepared by the method disclosed by Coulthard et al. in "Biochemical Journal," vol. 39, page 24, 1945. Reference is also here made to Baker Patent No. 2,482,724, dated September 20, 1949, now Reissue Patent No. 23,523 dated July 22, 1952, which discloses a process of preparing an enzyme from a species of Penicillium and which has both a high catalase and a high glucose oxidase activity. An enzyme from a source such as disclosed in the Baker Patent No. 2,482,724 is preferred for carrying out the process of this invention. Generally speaking, it is not necessary to add catalase to the enzyme system prepared by the process of that patent. However, it will be apparent that catalase may be added where required.

For a more complete understanding of this invention, reference will now be made to specific examples illustrating methods by which the process of this invention may be carried out.

*Example 1*

One hundred parts of fresh egg whites were divided into two 50 part lots. One lot, which was considered the control, was whipped to a froth in a beater and spread in a thin uniform layer on a stainless steel pan. To the second lot was added 1.5 parts of an enzyme preparation having a glucose oxidase activity of about 200 units per cubic centimeter. This second lot of egg white was similarly whipped to a froth and spread in a uniform layer on another stainless steel pan. Both lots were placed under an infra red lamp and air-dried with a current of air from a fan. The contents of each pan were stirred frequently until dry and when dry they were finely ground, bottled, and a sample of each was taken for a storage test. This test was run by placing approximately 5 grams of each sample in a covered beaker and incubating in a 55° C. oven for 16 hours. This was in the nature of a preliminary accelerated storage test and it was noted that the control turned a distinct amber and brownish color, whereas the sample treated with the glucose oxidase enzyme remained practically unchanged.

The foregoing example demonstrates the superiority on storage of an egg white treated with glucose oxidase in the presence of air over one which was not treated with the enzyme. While the method of this example does not represent at the present time a fully practical commercial operation, it nevertheless does demonstrate the advantages that are to be obtained by treating the egg white with the glucose oxidase in the presence of oxygen in order to obtain a product which is superior upon storage to a product from which no glucose has been removed by oxidation.

*Example 2*

This example is representative of a commercial process for treating egg whites which was carried out on a 5 ton batch of freshly broken eggs. A batch of 10,000 pounds of egg whites prepared from freshly broken eggs is neutralized with hydrochloric or lactic acid to a hydrogen ion concentration corresponding to about pH 7. To these egg whites are added 5 pounds of an enzyme solution having a glucose oxidase activity of about 125 units per cubic centimeter and a catalase activity of about 50 units per cubic centimeter. This enzyme solution is a commercial preparation known as Deoxygenase, obtained from the Vita-Zyme Laboratories, Inc. of Chicago, Illinois. The resulting egg whites in the tank thus contain glucose oxidase in the concentration of about 28 units for every pound of raw egg white (wet basis).

To the enzyme-containing egg whites are then added about 5 pounds of 100 volume peroxide (30 per cent) and the egg whites are subjected to mild agitation for a period of 24 hours. During this period and for the first 22 hours additional 30 per cent hydrogen peroxide is added at a rate of about 2½ pounds of peroxide per hour and the batch is maintained at 70° to 80° F. Two hours after the last hydrogen peroxide addition or after the total elapsed time of 24 hours, the conversion of glucose to gluconic acid is substantially complete and the egg whites are subjected to the usual spray-drying operation. The egg whites produced by the process are odor-free and show no tendency to develop off-colors, off-odors or off-flavors upon storage. During the enzymatic conversion process the hydrogen ion concentration of the egg whites does not become greater than that corresponding to about pH 6.6 and accordingly there is no precipitation of mucin or mucoid fractions from the egg white and these substances therefore appear unaltered in the final product. Thus the product retains its original solubility characteristics. The amount of glucose in the egg white is reduced from about 2.8% to less than about 0.1% (dry basis) by the above-indicated process.

It will, of course, be apparent that the details of carrying out the process indicated in the foregoing example may be modified over a fairly wide range without departing from the spirit and scope of this invention. For example, the rate of conversion of glucose to gluconic acid may be increased by increasing the concentration of glucose oxidase added to the egg whites. For example, if the level of enzyme added is raised to about one part per thousand of egg whites (about 50 to 65 units of glucose oxidase per pound), the conversion is completed in approximately 8 hours at 25° to 27° C. If the level of enzyme added is further increased to about one part in 500 parts of egg whites (about 100 to 125 units of glucose oxidase per pound), the conversion may be completed in about 3½ hours where the temperature is maintained at 37° C. Usually the lower practical concentration of enzyme that is preferred is about 10 units of glucose oxidase per pound of raw egg white.

Generally speaking, increased temperatures up to about 40° C. will increase the rate of conversion but any temperature between about 4° and 40° C. is satisfactory. However, where low concentrations of enzyme are employed and a relatively long period of time is contemplated for effecting the conversion, it is advisable to employ the lower temperatures in order to slow down any growth of microorganisms that may occur in the batch. It is pointed out at this point, however, that the process employing hydrogen peroxide is preferred for the additional reason that the peroxide provides a bacteriostatic effect which inhibits the growth of bacteria and other microorganisms in the eggs undergoing conversion and, as a matter of fact, tends to destroy any microorganisms that may have been present originally in the batch.

In the commercial operation it is preferred to add to the egg whites all of the enzyme that will be required at the initiation of the processing step. As previously indicated, the amount of enzyme to be added will in part be determined by the rate at which it is desired for the conversion to take place. Generally speaking, the glucose oxidase activity of the enzyme in the solution being treated should be in excess of about ten units for every pound of raw egg white. One unit of glucose oxidase may be defined as that amount of enzyme which will cause the uptake of 10 cubic millimeters of oxygen per minute at 30° C. under conditions in which 100 cc. of 3 per cent glucose adjusted to pH 5.9 in a 1/10 molar aqueous phosphate buffer is rapidly added to 1/10 cc. of enzyme solution being assayed and wherein the resulting solution is tested in 2.2 cc. quantities in 15 cc. Warburg flasks in a standard Warburg respirometer. For commercial operations and in order to obtain a conversion within a 24 hour period, the concentration indicated in Example 2 is satisfactory, that is, about 25 to 30 units of glucose oxidase for every pound of raw egg whites treated.

As indicated in Example 2, the ratio of catalase units to glucose oxidase units in the enzyme preparation employed may satisfactorily be about 1 to 3. However, it will be apparent that the amount or concentration of catalase in the egg whites undergoing conversion need only be adequate to catalyze the decomposition of the hydrogen peroxide formed and added to a degree sufficient to produce the required oxygen for the oxidation of glucose to gluconic acid. A catalase unit of activity as contemplated herein is the same as that defined in the application of Dwight L. Baker, Serial No. 179,651, filed of even date herewith, now Patent No. 2,651,592.

The amount of hydrogen peroxide added to the solution during treatment may also be varied. However, generally speaking, sufficient hydrogen peroxide should be added in the over-all process which is equivalent to a minimum of at least about 6 parts of 100 volume hydrogen peroxide (30 per cent) for every 1000 parts of raw egg whites. If less than this amount of hydrogen peroxide is added, there may be insufficient free oxygen liberated to completely oxidize the glucose. It is also desirable that the hydrogen peroxide be added to the treated solution periodically so that the glucose oxidase will have ample time to cause the free oxygen liberated to react with the glucose present. If the hydrogen peroxide is added all at once to the solution, it will be decomposed rapidly by the catalase and the oxygen will be given off of the solution at a rate faster than the glucose and the glucose oxidase can take care of it. This results in a waste of hydrogen peroxide and also results in the production of a foam which is difficult to contain in the treating vessels.

The hydrogen ion concentrations at which the reaction may be carried out do not appear to be critical and the enzymatic conversion process has been found under certain conditions to be effective within a range of pH 3.5 to over 9.0. However, as indicated above in the treatment of egg whites, it is usually desirable at all times to maintain the pH below about 7.5 or 8.0 but above 6.3 in order to prevent the separation of mucin and mucoid fractions. This occurs automatically in the herein disclosed process since the final acidity, without neutralization, usually is at a value corresponding to about pH 6.6.

In commercial operations agitation is important in order to insure that all of the ingredients are thoroughly mixed while the hydrogen peroxide is being added to the batch. Generally speaking, increased agitation will give better results and the degree of agitation does not appear to be particularly important if the resulting egg whites are to be fluff-dried. However, if the treated product is to be spray-dried or freeze-dried, then the agitation should be reduced to minimize the formation of foam which latter may interfere in these types of drying operations.

In the foregoing, this invention has been described with emphasis on a method for producing dehydrated egg albumen. However, the process is useful in removing glucose from whole eggs. In carrying out such a process substantially the same procedure as indicated in Example 2 may be employed, employing whole raw eggs in place of egg whites.

The invention also has applicability in the removal of glucose from food products other than egg constituents. For example, the process is adapted for use in the removal of glucose from potatoes, coconut and cereals. In connection with potatoes and coconut, it is desired partially or completely to remove the glucose prior to a dehydrating step in order to prevent the undesired browning reaction which may occur during drying or on the storage of these dried products. Thus in the treatment of potatoes they may, in the sliced, diced or mashed form, be treated with glucose oxidase in the presence of oxygen and water whereby at least a portion of the free glucose is converted to innocuous gluconic acid. Thereafter the potatoes are subjected to the usual dehydrating procedure resulting in an improved product having enhanced storage qualities.

Likewise coconut may be treated in the same manner before drying in order to remove undesired glucose.

In connection with cereals the invention has applicability in removing free glucose, thereby having utility in the preparation of certain diabetic foods. In addition by the removal of glucose, which is believed otherwise to react with certain protein constituents to form unassimilable compounds, the protein availability of the cereal is thereby increased.

As indicated in the foregoing, an important feature of this invention is the provision of a food product or an egg product normally containing substances which react with glucose or other aldose to form undesired reaction products, which food product is substantially free of glucose and which is characterized by the presence of gluconic acid. The gluconic acid in the final product may be valuable in that it tends to buffer it to an acidity slightly on the acid side. In the case of egg whites which are used in the preparation of ready mixes for cakes and the like, this may be a desirable factor in connection with the bleaching operation to which the cake flour is subjected. Also the presence of gluconic acid in egg whites may be a valuable factor in preventing or inhibiting undesired sugar inversion where the egg white employed is to be used in the manufacture of certain candies. The problem of sugar inversion is important in the hard candy industry. Inasmuch as the glucose all appears as gluconic acid in the product, there is no loss from this source and increased yields are obtained over fermentation processes in which the glucose is converted to gaseous and volatile products, such as carbon dioxide, water and ethyl alcohol.

Another feature, and a very desirable feature, of the product of this invention is that substantially all of the glucose has been removed from the treated food product without introducing into the product a host of fermentation microorganisms. Such microorganisms carry over in vast quantities into the final dried products prepared by the use of lactic acid bacteria or yeasts as fermenting agents. Inasmuch as the process of the preferred embodiment of this invention is carried out by a nonviable enzyme system (that is, without the use of living microorganisms as the primary converting agents), there are substantially no microorganisms carried over into the final product except those which may have originally been present in the food product treated. Even this number is substantially reduced in the present process because of the sterilizing effect of the hydrogen peroxide employed in the preferred operation.

While this invention has been described with particular reference to the removal of glucose from food products, it also has broader applicability for the removal of other aldoses, such as xylose, mannose, galactose, arabinose and the like. In such cases an aldose oxidase is employed as the principal enzyme which is capable of converting the particular aldose to the corresponding sugar acid.

It will be apparent that free oxygen, supplied as such or by the action of catalase on hydrogen peroxide, is required to oxidize the sugar. Thus to obtain the desired degree of glucose conversion it is preferred that the free oxygen (as such or as hydrogen peroxide) be concomitantly added to the reaction mixture from an external source. Also, as the foregoing examples indicate, stoichiometric excesses of free oxygen (as such or as hydrogen peroxide) are usually required to obtain complete conversion.

While several particular embodiments of this invention are suggested above, it will be understood, of course, that the invention is not to be limited thereto, since many modifications may be made, and it is contemplated, therefore, by the appended claims, to cover any such modifications as fall within the true spirit and scope of this invention.

I claim:

1. The process of removing glucose from a food product containing glucose and a proteinaceous substance which comprises admixing said food product in the presence of water with a stoichiometric excess of hydrogen peroxide and a nonviable enzyme system having glucose oxidase and catalase activity whereby said glucose is converted to gluconic acid.

2. The process recited in claim 1 wherein said food product is potato.

3. The process recited in claim 1 wherein said food product is coconut.

4. The process recited in claim 1 wherein said food product is a cereal.

5. A process of removing glucose from egg constituents which comprises subjecting said constituents to the action of a nonviable enzyme system having glucose oxidase activity in the presence of water with the concomitant addition of free oxygen from an external source.

6. A process of removing glucose from egg constituents which comprises subjecting said constituents to the action of a nonviable enzyme system having catalase and glucose oxidase activities with the concomitant addition from an external source of hydrogen peroxide in the presence of water for a period of time sufficient to convert the glucose in said constituents to gluconic acid.

7. A process of removing glucose from undried egg constituents which comprises subjecting said constituents to the action of a nonviable enzyme system having glucose oxidase activity with the concomitant addition of an excess of free oxygen.

8. A process of removing glucose from undried egg whites which comprises subjecting said whites to the action of a nonviable enzyme system having a glucose oxidase activity in the resulting mixture of over about 10 units per pound of egg white on a wet basis with the concomitant addition of a stoichiometric excess of free oxygen.

9. A process of preparing dried egg whites which comprises subjecting raw egg whites to the action of a nonviable enzyme system having glucose oxidase and catalase activity and with the concomitant addition of a stoichiometric excess of hydrogen peroxide for a time sufficient to convert a substantial proportion of the glucose contained in the egg whites to gluconic acid, and thereafter dehydrating the resulting egg whites.

10. A process of preparing dried egg whites which comprises adding a nonviable enzyme system having high catalase and glucose oxidase activity to raw egg whites, adding a stoichiometric excess of hydrogen peroxide to the resulting media from time to time in an amount sufficient to convert the normal glucose present in the egg whites to gluconic acid and thereafter dehydrating the egg whites.

11. A process of preparing dried egg whites substantially free of naturally occurring glucose which comprises adding to raw egg whites a nonviable enzyme system having a high glucose oxidase and catalase activity, the activity of the glucose oxidase in the resulting mixture being in excess of about 10 units for every pound of raw egg whites, thereafter adding a stoichiometric excess of hydrogen peroxide to the mixture over a period of time whereby the glucose content of the mixture is substantially reduced, and then drying the resulting mixture.

12. A process of removing glucose from a food product containing said glucose and a proteinaceous substance which comprises subjecting said food product to the action of a nonviable enzyme system having glucose oxidase activity in the presence of water with the concomitant addition of free oxygen from an external source whereby said glucose is converted to gluconic acid.

13. A process of removing glucose from a food product containing said glucose and a proteinaceous substance which comprises subjecting said food product to the action of a nonviable enzyme system having catalase activity and glucose oxidase activity in the presence of water with the concomitant addition from an external source of an excess of hydrogen peroxide whereby said glucose is converted to gluconic acid.

14. The process recited in claim 12 wherein said food product is potato.

15. The process recited in claim 12 wherein said food product is coconut.

16. The process recited in claim 12 wherein said food product is cereal.

17. The process recited in claim 12 wherein said food product comprises egg constituents.

18. The process recited in claim 1 wherein said food product comprises egg constituents.

19. The process recited in claim 13 wherein said hydrogen peroxide is added to the food product over a period of time.

20. The process recited in claim 6 wherein said hydrogen peroxide is added to said egg constituents over a period of time.

References Cited in the file of this patent

UNITED STATES PATENTS

| | | |
|---|---|---|
| 1,809,797 | Cahn | June 9, 1931 |
| 1,818,214 | Epstein | Aug. 11, 1931 |
| 1,849,053 | Bernhauer | Mar. 15, 1932 |
| 1,893,819 | Currie | Jan. 10, 1933 |
| 2,006,086 | May | June 25, 1935 |
| 2,482,724 | Baker | Sept. 20, 1949 |

FOREIGN PATENTS

| | | |
|---|---|---|
| 626,848 | Great Britain | July 1949 |

OTHER REFERENCES

Porter: Bacterial Chemistry and Physiology, 1946, John Wiley and Sons, page 332.

Foster: Chemical Activities of Fungi, Academic Press Inc., 1949, pages 458–461.

Tauber: Chemistry and Technology of Enzymes, 1949, Wiley, page 246.